W. A. CASWELL.
Hose-Couplings.
No. 149,029.          Patented March 31, 1874.
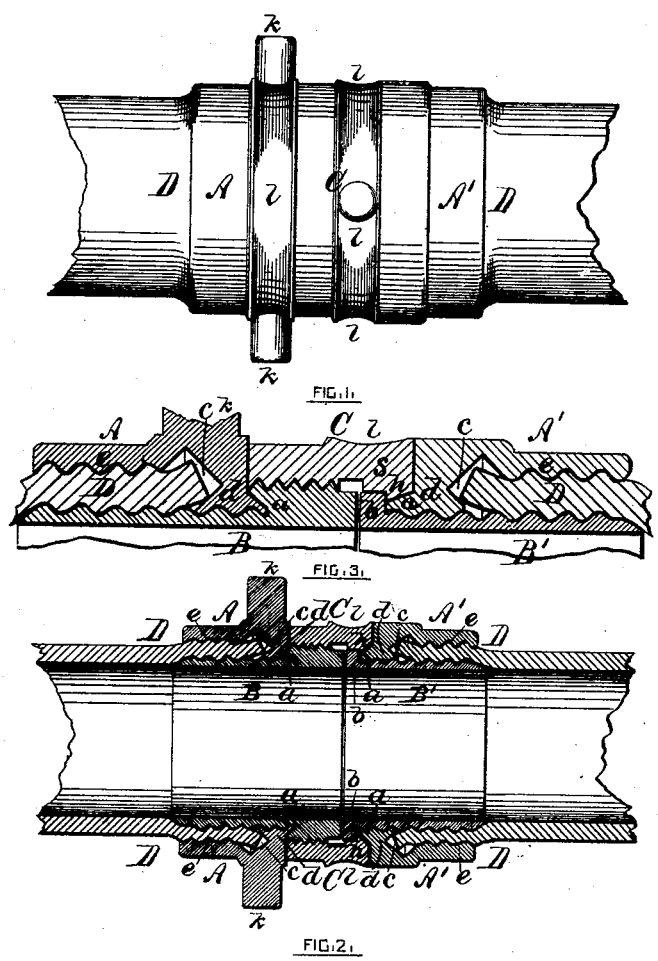

UNITED STATES PATENT OFFICE.

WILLIAM A. CASWELL, OF PROVIDENCE, RHODE ISLAND, ASSIGNOR OF TWO-THIRDS OF HIS RIGHT TO EDWIN M. WALDRON AND EDWIN V. BOWEN, OF SAME PLACE.

IMPROVEMENT IN HOSE-COUPLINGS.

Specification forming part of Letters Patent No. 149,029, dated March 31, 1874; application filed November 13, 1873.

*To all whom it may concern:*

Be it known that I, WILLIAM A. CASWELL, of the city and county of Providence and State of Rhode Island, have invented certain Improvements in Hose-Couplings, of which the following is a specification:

My invention relates to that class of couplings employed upon rubber and other flexible hose; and consists in the peculiar formation of the outer ring or band, and in the arrangement of the several parts, so that the attachments can be more readily made, and a more secure hold obtained upon the hose, and at the same time avoiding all injury to the hose while attaching the coupling.

In the accompanying drawings, Figure 1 is a view of my improved coupling with the hose attached at each end. Fig. 2 is a longitudinal vertical section of the same. Fig. 3 is the upper half of Fig. 2 enlarged.

A A' are the encompassing rings or sleeves. B B' are the tail-pieces. C is the swivel-piece. D is the hose inserted between the outer ring and tail-piece. The surface of each tail-piece is very nearly that of a cylinder, and the inner surface of the encompassing ring is parallel therewith, with the exceptions hereinafter shown. The outer ring is provided upon its inner surface with a coarse rounded screw-thread, $e$, and near the bottom with a chamber or recess, $c$, so arranged that when the end of the hose is carried down to the bottom of the ring it is slightly expanded into the chamber, to allow the entrance of the tail-piece B without chafing or injuring the end of the hose. The outer ring is also provided with a shoulder, $d$, having upon its face a continuation of the thread $e$, so that when the tail-piece B, which is provided with the same thread, working into the thread on the shoulder $d$, is inserted and carried home, the thread upon this piece will invariably come opposite the groove on the inner surface of the encompassing ring, and the hose, previously inserted, is laid in folds or corrugations between the corrugated surfaces of the two rings, the thread extending the whole length of the tail-piece and the whole length of the outer ring, except the chamber. It is desirable to give a considerable length to the face of the shoulder $d$, in order to steady the tail-piece and carry it straight down through the sleeve without binding or crowding unequally against the side of the hose. A wedge-shaped projection, $a$, is carried back from the inside end of the sleeve, which, on the swivel end, abuts against a shoulder, $b$, on the tail-piece B'. This projection, in connection with the notch or shoulder $h$ in the swivel-piece C, helps to form the swivel $s$. By using this device it is obvious that a greater length of shoulder is obtained without increasing the length of the coupling. The other end of the swivel-piece C is connected with the tail-piece B by a screw, according to a well-known device. The space $l$ between the horns $k$ is concaved to receive the wrench while holding or turning the coupling, which prevents the wrench from slipping sidewise.

The coupling is applied by first passing the outer ring over the end of the hose until the latter is brought down into the chamber $c$ and sufficiently expanded against the sloping sides of the chamber for the free entrance of the tail-piece. The tail piece is then entered, and, by means of the screw upon its surface and the screw upon the shoulder $d$, is carried into its place. By reason of the similarity of the screws, the thread upon the tail-piece, after it has passed the shoulder $d$, will come opposite the groove of the corresponding or female screw, and following it through its whole length, the hose is pressed down into the cavities—that is, the portions of the hose pressed upon and displaced by the thread of either screw are received into the corresponding grooves or recesses between the threads of the other.

Couplings have heretofore been in use where the contiguous surfaces of the tail-piece and outer ring are parallel, and above the tail-piece works its way into the hose by means of a thread working into the texture of the hose; and others where the tail-piece is carried in by means of a thread on a shoulder, the outer ring having a thread on some portion of its interior surface, turned in a contrary direction to that on the tail-piece, so that they do not move together.

In my invention, the tail-piece is controlled and moved from the shoulder without assistance from the hose, and the screw on the tail-piece is made to match both that on the shoulder and that on the interior surface of the encompassing ring, they being male and female.

The patent of Charles W. Emery, July 11, 1865, shows the same general style of thread, to which I make no specific claim; but his tail-piece must be made more or less tapering or conical, and the hose consequently expanded and weakened, and, having no shoulder to govern the tail-piece, there is difficulty in making the thread find its place.

In my construction the form of the tail-piece may be cylindrical, requiring little or no expansion.

I make no specific claim to the shoulder $d$, nor to the shoulders $b$ or $h$, they being old devices; nor to the swivel $s$, except in combination.

What I claim is—

1. The encompassing ring or sleeve A of a coupling, provided with a chamber, $c$, at the bottom sufficient to allow of a slight expansion of the extreme end of the hose, and also provided with a projection, $a$, and with a screw-thread, $e$, extending the whole length of the interior surface, including the face of the shoulder $d$, with the exception of the chamber $c$, substantially as shown, and for the purpose specified.

2. The combination, in the hose-encompassing ring, of the shoulder $d$ and the sloping-sided chamber or recess $c$, in which the end of the hose is received and bent up out of the way of the tail-piece, as shown and set forth.

3. The thread $e$ on the interior surface of the outer ring, in combination with a thread of the same size and pitch on the face of the shoulder $d$, substantially as and for the purpose specified.

4. The combination, with the hose-encompassing ring, screw-threaded on its main interior surface and its shoulder, of the tail-piece, screw-threaded on its exterior, all of said screw-threads having the same pitch, as and for the purposes described.

5. The combination and arrangement of the tail-piece B' and shoulder $b$, the outer ring A', with shoulder $d$ and projection $a$, and swivel-piece C, with notch or shoulder $h$, substantially as described.

6. The groove or depression $l$ on the outer surface of the coupling between the horns $k$, substantially as described, and for the purpose specified.

W. A. CASWELL.

Witnesses:
   D. D. CATEANACH,
   E. V. BOWEN.